United States Patent [19]

Gosau

[11] 4,073,452
[45] Feb. 14, 1978

[54] APPARATUS FOR DELAYING THE PRESSURE DROP IN PRESSURIZED CABINS OR THE LIKE ESPECIALLY IN AN EMERGENCY

[75] Inventor: Dieter Gosau, Hamburg, Germany

[73] Assignee: Messerschmitt-Bolkow-Blohm Gesellschaft mit beschrankter Haftung, Munich, Germany

[21] Appl. No.: 710,344

[22] Filed: July 30, 1976

[30] Foreign Application Priority Data

Aug. 14, 1975 Germany .............................. 2536231

[51] Int. Cl.² ............................................. B64D 45/00
[52] U.S. Cl. .................. 244/118 R; 244/121; 244/129.4
[58] Field of Search ........... 244/118 R, 117 R, 118 P, 244/119, 121, 129.4, 129.5; 105/466, 467, 469; 52/99–100, 202; 49/57; 160/368 G, 113, 105, 290 R, 327, 328; 114/228, 229, 74 R

[56] References Cited

U.S. PATENT DOCUMENTS

| | | | |
|---|---|---|---|
| 1,253,293 | 1/1918 | Sons | 114/228 |
| 1,319,378 | 10/1919 | Deam | 114/229 |
| 2,605,064 | 7/1952 | Davis | 244/118 R |
| 2,624,403 | 1/1953 | Zelenko | 160/290 F |
| 2,669,402 | 2/1954 | Del Mar | 244/118 R |
| 2,949,841 | 8/1960 | Richardson | 244/118 R |
| 2,989,787 | 6/1961 | Smith | 52/1 |
| 3,389,665 | 6/1968 | Kauffman | 160/368 G |
| 3,885,685 | 5/1975 | Montgomery et al. | 244/118 R |

FOREIGN PATENT DOCUMENTS

| | | | |
|---|---|---|---|
| 375 | 1/1936 | Australia | 160/290 R |
| 17,223 | 6/1898 | Switzerland | 160/290 R |

*Primary Examiner*—Galen L. Barefoot
*Attorney, Agent, or Firm*—W. G. Fasse; W. W. Roberts

[57] ABSTRACT

The pressure drop in a pressurized cabin, for example, in an aircraft cabin, is delayed following the occurrence of an emergency resulting from a door failure, by a mat which has a low air permeability. Such a mat is mechanically secured to the cabin structure to cover the openings in the cabin or body on the inside thereof, for example, to cover a door opening in flight. The air permeability of these mats is such that a pressure equalization is delayed by a time safe enough for humans, whereby the pressure equalization rate does not exceed approximately 2.4 PSI/sec.

19 Claims, 16 Drawing Figures

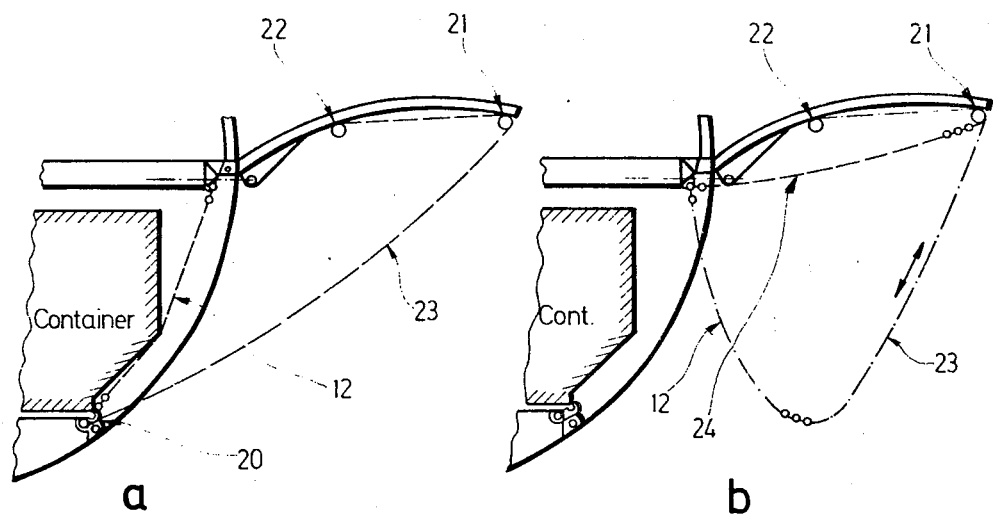
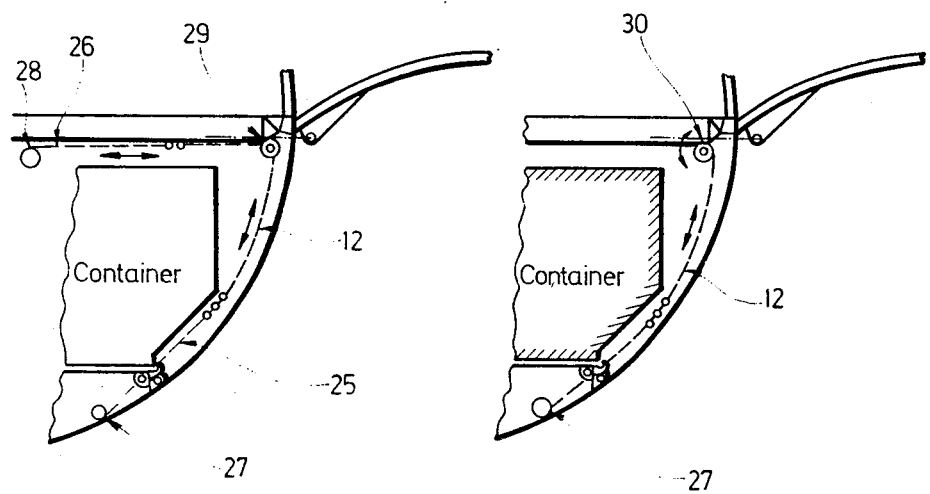
Fig.5
Fig.6  Fig.7

APPARATUS FOR DELAYING THE PRESSURE DROP IN PRESSURIZED CABINS OR THE LIKE ESPECIALLY IN AN EMERGENCY

BACKGROUND OF THE INVENTION

The invention relates to an apparatus for delaying the pressure drop in a pressurized cabin or the like in an emergency. Such pressure drop may, for example, occur in an aircraft body when a door locking mecanisme or seal fails in flight. Heretofore, such failures of the door seal made it practically unavoidable that the pressure equalization took place instantaneously. However, it is important that in such emergencies the pressure inside the cabin or aircraft body is not instantaneously adapted to the pressure outside the cabin. The resulting damage might cause crash landings. Therefore, it is desirable that the pressure equalization is delayed as much as possible.

Thus, especially in passenger aircraft, efforts are being made to construct the doors in a highly reliable manner. Thus, it is known to take advantage of the pressure inside an aircraft cabin for pressing the doors during flight against the holding hardware forming part of the aircraft body. Freeing the door from such holding means may be accomplished by lifting, lowering, or laterally shifting the door. This type of door closure assures a relatively high reliability, especially in combination with effective locking and control devices, however, the costs are rather high.

However, in larger aircrafts, especially in freight type aircrafts, the space required for the above type of door structure prevents its use because the available space must be used in an economical manner. Freight space doors are quite frequently hinged about a horizontal axis arranged in the area of the upper door edge. The door structure is such, that in the closed condition the door is interlocked with the surrounding aircraft body structure so that the door is capable of taking up the loads resulting from the pressure inside the aircraft body structure. Thus, the safety of such doors depends entirely on the locking mechanism. If the locking mechanism fails for any reason whatsoever, it is possible that the door springs open during the flight.

In modern large volume aircrafts the volume of the aircraft body is divided substantially in half by a floor. Above the floor there is the space for passengers and below the floor there is the freight space. Both spaces are under inner pressure during the flight, whereby a pressure equalization is accomplished through a respective device in the floor. Thus, when, for example, a door of the freight space springs a leak or is lost altogether during the flight, the pressure in the freight space drops abruptly, for example, within 50 msec. The pressure in the passenger cabin or space cannot be equalized with such a rapidity whereby the floor may yield to the pressure inside the passenger cabin thereby breaking. Such destruction of the floor may damage or destroy vital systems, especially system conduits, which in trun may cause the crash of the respective aircraft.

OBJECTS OF THE INVENTION

In view of the above it is the aim of the invention to achieve the following objects singly or in combination:

to avoid the drawbacks of the prior art, more specifically, to assure a relatively slow pressure equalization in the cabin or freight space pressure relative to the outside pressure;

to avoid very expensive and space consuming door locking mechanisms;

to provide means which will assure a slow pressure equalization even if the door seals should suddenly fail;

to delay the pressure equalization to such an extent that the time required for reaching the outside pressure also inside the cabin will require several seconds so that the pressure equalization in the cabin or aircraft may avoid damage or destruction of the separating floor; and to delay the pressure equalization to such an extent that damage to passengers and crew will be avoided, for example, so that the pressure equalization rate does not exceed a value of approximately 2.4 PSI/sec.

SUMMARY OF THE INVENTION

According to the invention, there is provided a pressure equalization means in the form of an air permeable mat which covers any openings, such as door openings, in the body structure of an aircraft during flight.

The slightly air permeable mats close the opening such as the door openings in addition to the regular doors, whereby a simple and effective solution for the above outlined problems is achieved, especially when the mat means are secured to the frame structure surrounding the opening in such a manner that in the emergency the forces or loads effective on the frame structure are taken up by the mat. According to the invention the mats are made of belts which are interlaced or interwoven in a crisscross fashion. Such belts may be made of suitable materials, such as polyamid or polyester.

It is especially advantageous to secure the mat during flight along the upper and lower edge supports of the door opening and thus with the aircraft structure in a force transmitting manner, whereby in an emergency the mat is capable to take up the forces to which the aircraft structure is subjected by the failure of a door lock or seal. In this context it may also be advantageous if each belt of the mat is individually connected to the aircraft structure, that is, independently of each other.

Further, it is advantageous to attach the mats across a door opening in such a manner that it may easily be secured in place, for example, by mechanical means which raise and lower the mat somewhat in the manner or window shades as will be described in more detail below with reference to example embodiments.

BRIEF FIGURE DESCRIPTION

In order that the invention may be clearly understood, it will now be described, by way of example, with reference to the accompanying drawings, wherein:

FIGS. 5a, 5b illustrate an embodiment of the mat according to the invention which is guided on the inside of the open freight space door;

FIG. 6 illustrates an embodiment in which the mat of the invention is actuated by means of two rope drums;

FIG. 7 illustrates a mat according to the invention which may be wound up on a roller when it is not in a door covering position.

FIG. 10 shows another embodiment of securing means for connecting the mat to the upper edge of the door frame thereby showing a section along line B—B in FIG. 11.

DETAILED DESCRIPTION OF PREFERRED EXAMPLE EMBODIMENTS

Figure 1:
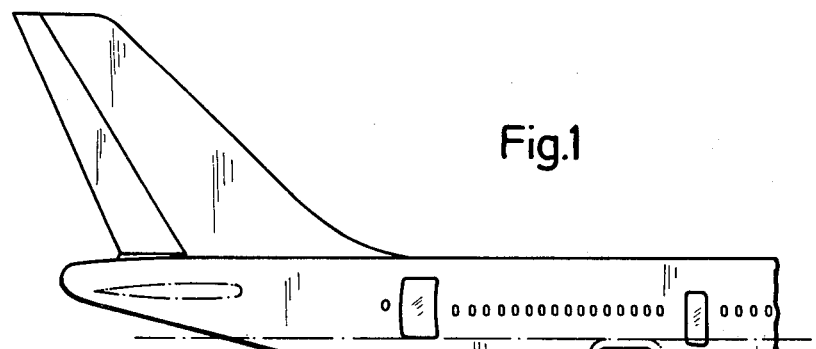
FIG. 1 illustrates a partial side view of the rear portion of an aircraft with a freight door below the floor opening as viewed from the outside.

FIG. 1 shows a partial view of an aircraft body of a modern large space transport aircraft having a freight space door 11 below the floor plane 11'.

Figure 2:
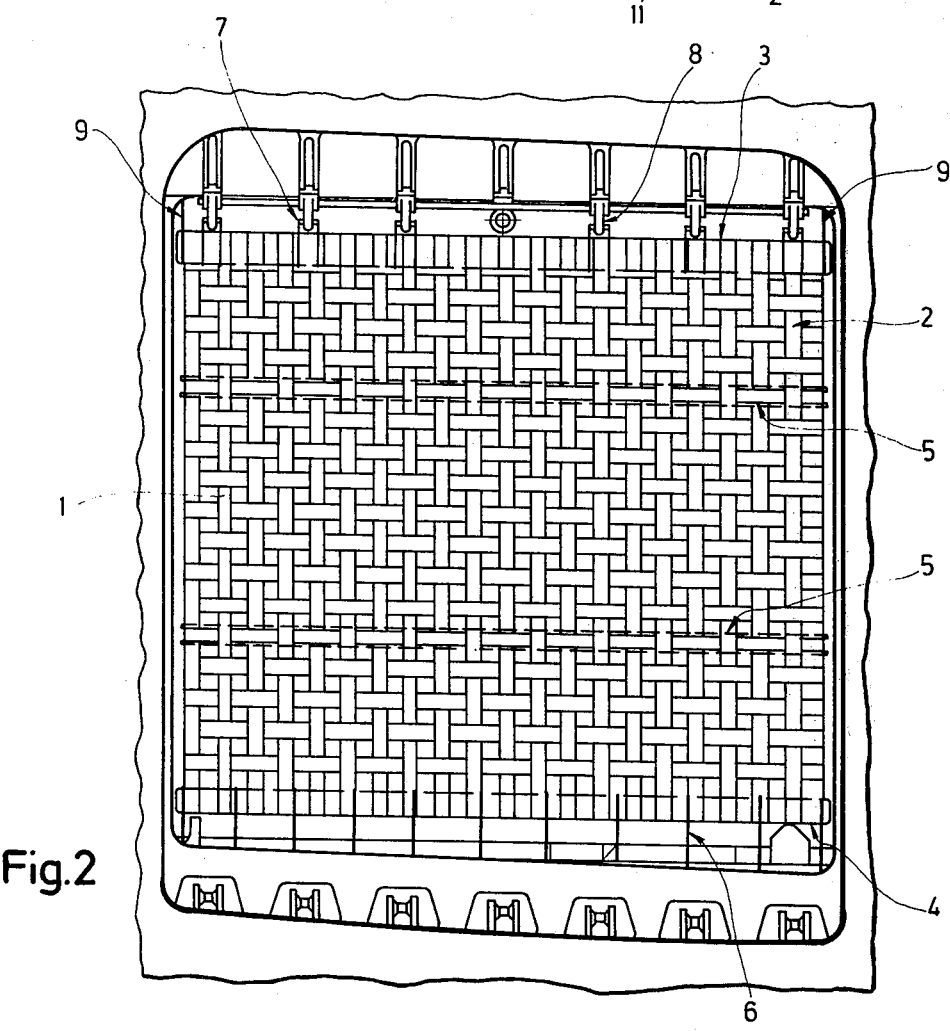
FIG. 2 illustrates a plan view of a mat structure according to the invention, placed in the position "z" as shown in FIG. 1 and as viewed from the inside of the aircraft and on an enlarged scale relative to FIG. 1.

FIG. 2. shows the door opening of the freight space door according to FIG. 1 covered with one example embodiment of the mat 1 according to the invention as viewed from the inside out, that is, when the door is closed during the flight. The door itself, however, is not shown for simplicity's sake. The mat 1 comprises a plurality of belts 2, an upper profiled rod 3, a lower profiled rod 4, and supporting rods 5 extending horizontally through the mat. The belts 2 are interwoven or interlaced in a crisscross manner as shown. Ropes 6 provide a force transmitting connection of the mat 1 to the structure of the lower edge of the door opening. The connection is not connected directly to the edge proper, but to the structure adjacent thereto. Eye-pieces 7 are secured to the upper profiled sectional rod 3. Hooks 8 secured to the upper edge of the door frame or opening, grip into the eyepieces 7. Thus, a force transmitting connection is also provided between the upper edge of the door opening and the mat. The lifting ropes 9 serve for actuating the mat, for example, in the manner of window shades.

Figure 3:
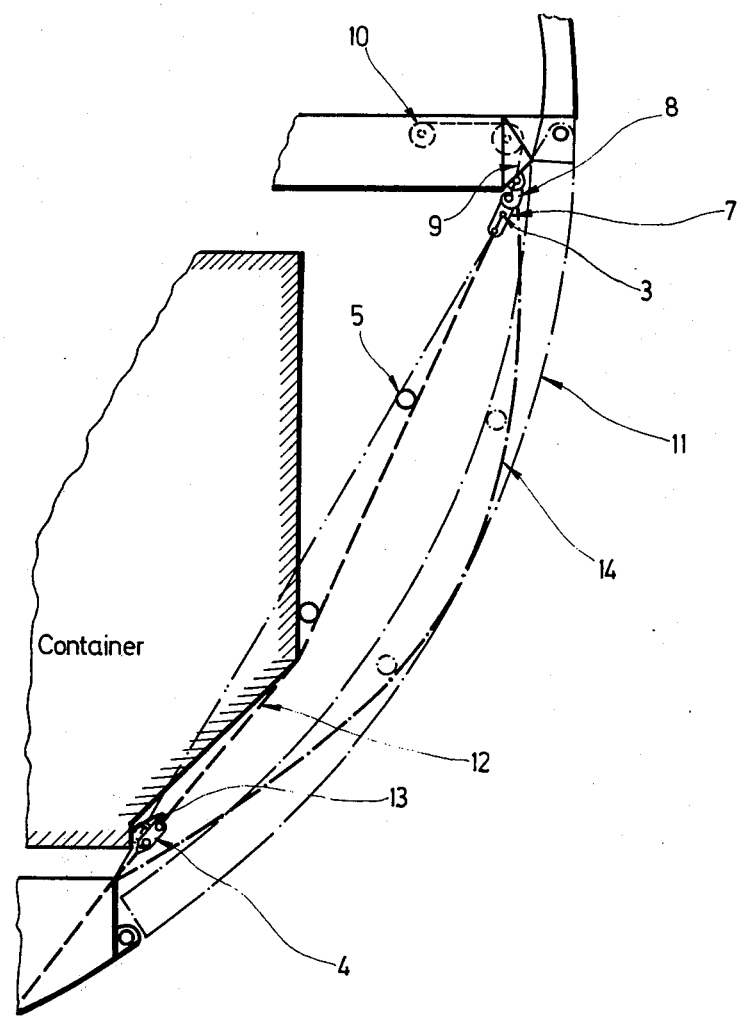
FIG. 3 is a sectional view through the freight door according to FIG. 1, in a plane perpendicularly to the longitudinal axis of the aircraft body.

FIG. 3 shows a section through the aircraft body perpendicularly to the direction of the longitudinal axis of the aircraft and through the freight space door according to FIG. 2. The position of the closed freight space door 11 is shown by a respective dash dotted line. Under normal conditions when the mat 1 is not subjected to a pressure equalization load the mat takes up the position indicated by the dashed line 12 with the supporting rods 5 extending horizontally and in parallel to each other. The eye-pieces 7 are held by the hooks 8 as seen in the upper right hand corner of FIG. 3. A plurality of such hooks and eyelets are arranged along the upper sectional rod 3 whereby the eyelets are secured to the rod 3 and the hooks are secured to the upper edge of the frame structure surrounding the door. When the freight space door 11 should spring a leak or be lost altogether, the mat takes up the position indicated by the heavy dash dotted line 14. In this position the mat 1 bulges outwardly under the higher pressure inside the cabin and the permeability of the mat will cause a slow pressure equalization inside and outside the cabin.

Figure 4:
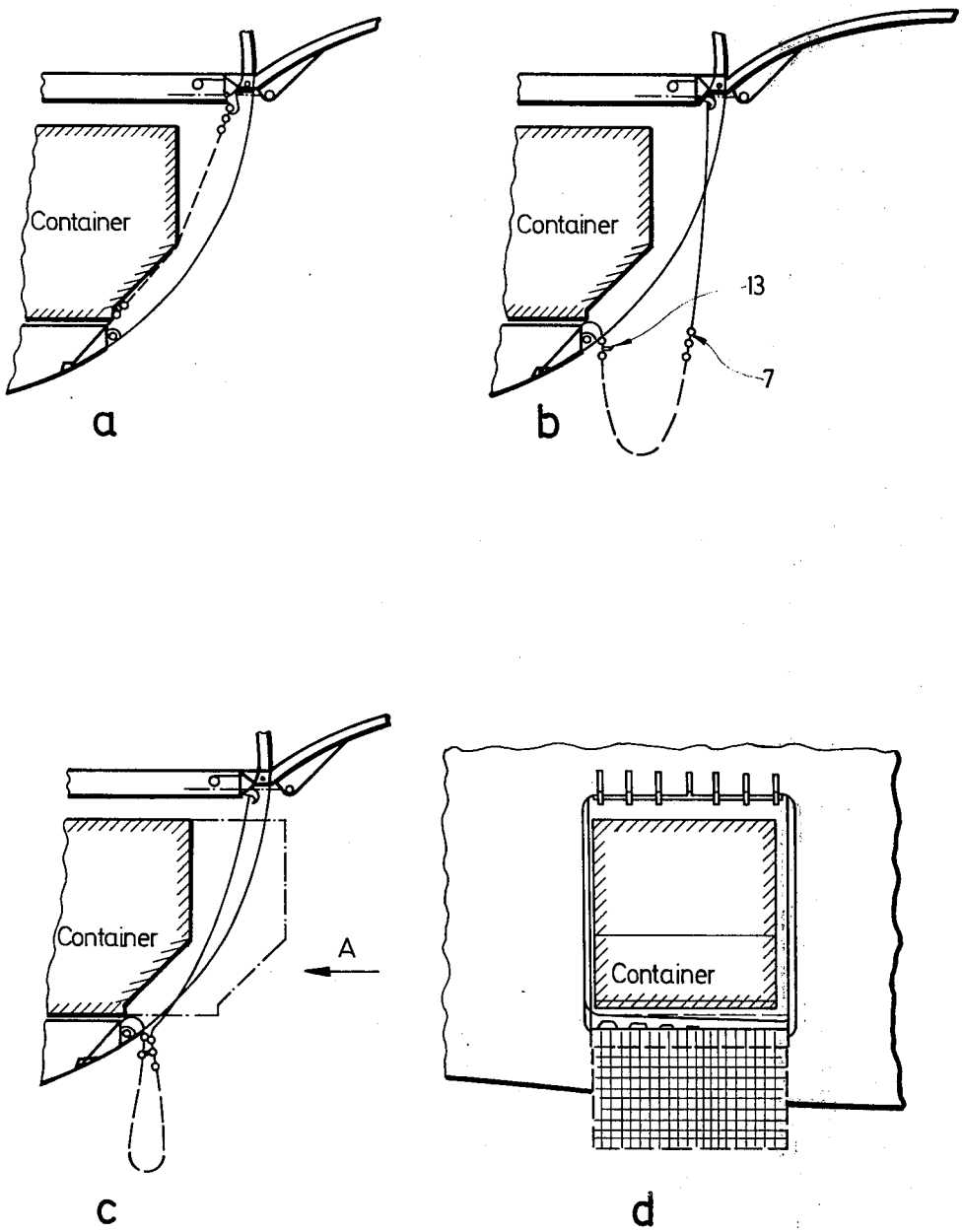
FIGS. 4a–4d illustrate different operational conditions of the freight space door according to FIG. 3.

FIG. 4 illustrates the most important operational states of the freight space door and mat in a summarizing manner. FIG. 4a shows the closed mat and the opened freight space door. FIG. 4b shows the mat in its lowered position with the door also in its open position. In FIG. 4c the mat is in the fully lowered position thus permitting the loading and unloading of the freight space throught the also opened door. FIG. 4d illustrates the position of the door and the mat as shown in FIG. 4c and as viewed in the direction of the arrow "A" as shown in FIG. 4c. In the loading or unloading position, the eye-pieces 7 of the mat are hooked into the hooks 13, thus, the mat is kept out of the way of the freight containers as they move into or out of the aircraft body and the mats thus do not interfere in any way whatsoever with the loading or unloading. In the embodiment of FIGS. 5a and 5b, the mat 12 is rigidly connected to the upper edge of the door opening and the releasable hook connection 20 is arranged adjacent to the lower edge of the door opening. In FIG. 5a the opened door is closed by the mat 12. In order to load or unload the aircraft the hook connection 20 is released and the mat is moved out of the way as shown in FIG. 5b. This is accomplished with the aid of ropes 23 driven by rope drums 22. The ropes 23 may run around guide rollers 21 to bring the mat 12 into the position 24 substantially alongside the open door for loading and unloading. This embodiment according to the invention has the advantage that the ropes for moving the mat do not need to run laterally adjacent to the door opening but are located substantially between the mat and the door itself. The described ropes 23 may be replaced by chains or belts or the like.

Another embodiment according to the invention is illustrated in FIG. 6 in which the mat 12 is movable by means of rope drums 27 and 28 over which pulling ropes 25 and 26 run around a guide roller 29 whereby the mat may easily be brought into and out of the door covering position, by moving the mat back and forth in the direction of the two double arrows shown in FIG. 6. In this arrangement the hooks would also be located adjacent the lower edge of the door opening.

In the further embodiment illustrated in FIG. 7, the mat 12 runs over a roller 30 which acts as a take up roller for the mat. A rope drum 27 is arranged as in FIG. 6. The mat may be moved either by rotating the take up roller 30 or the rope drum 27. The motor drive means for the roller and the drum are not shown, but well known in the art.

In the illustrated embodiments the hooks are shown at the lower edge of the door opening and the upper edge of the mat is permanently secured to the ropes or the like. The arrangement may also be in the opposite manner, namely, the hooks at the upper edge and the rope connection at the lower edge. The operation would still be the same.

Figure 8:
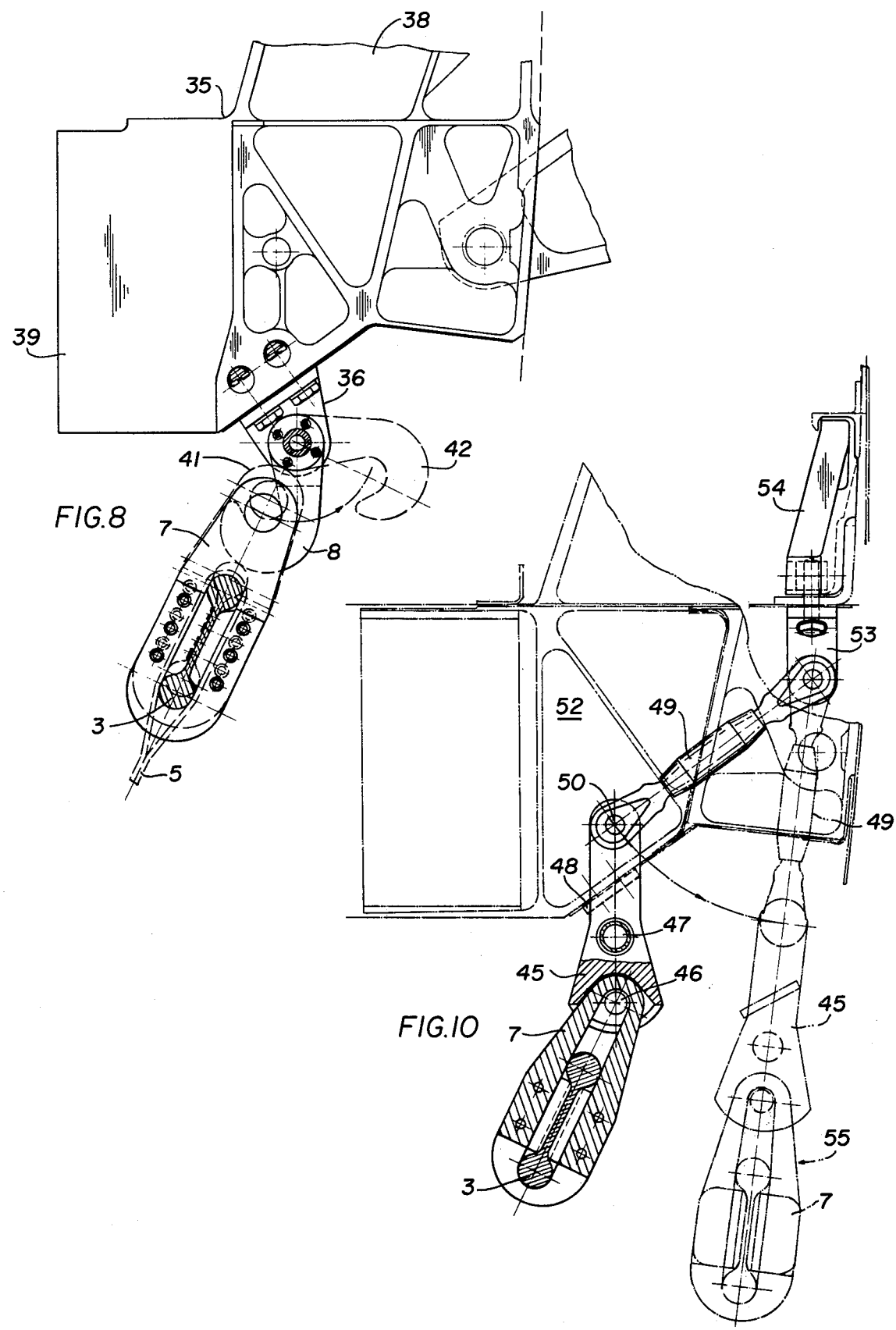
FIG. 8 shows a section through the upper portion of the door frame along line A—A in FIG. 9 to illustrate the hook for releasably securing the mat.
Figure 9:
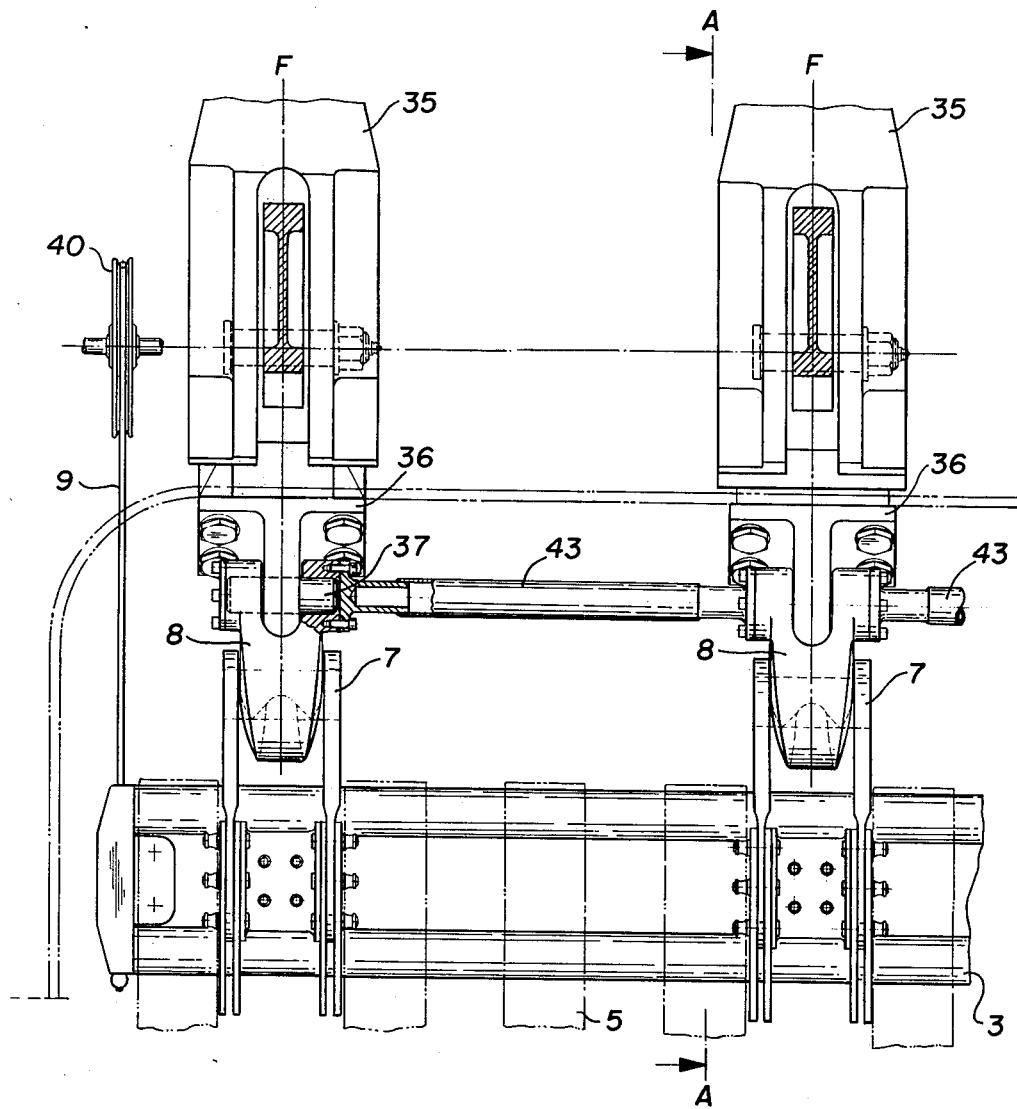
FIG. 9 is a view into the door opening with parts broken away to show the mat hooks in the closed, mat holding position.

FIGS. 8 and 9 illustrate on an enlarged scale a portion of an embodiment of securing means for connecting the mat to the door frame. FIG. 8 is a sectional view along the section line A—A in FIG. 9 with parts broken away in both figures to simplify the illustration. The hardware 38 of the frame structure forming the door frame is located at the frame ribs not shown, but extending in the planes F of the aircraft body structure. A hardware member 35 is connected to the respective rib and a bracket 39 is connected to the respective floor support.

Figure 11:
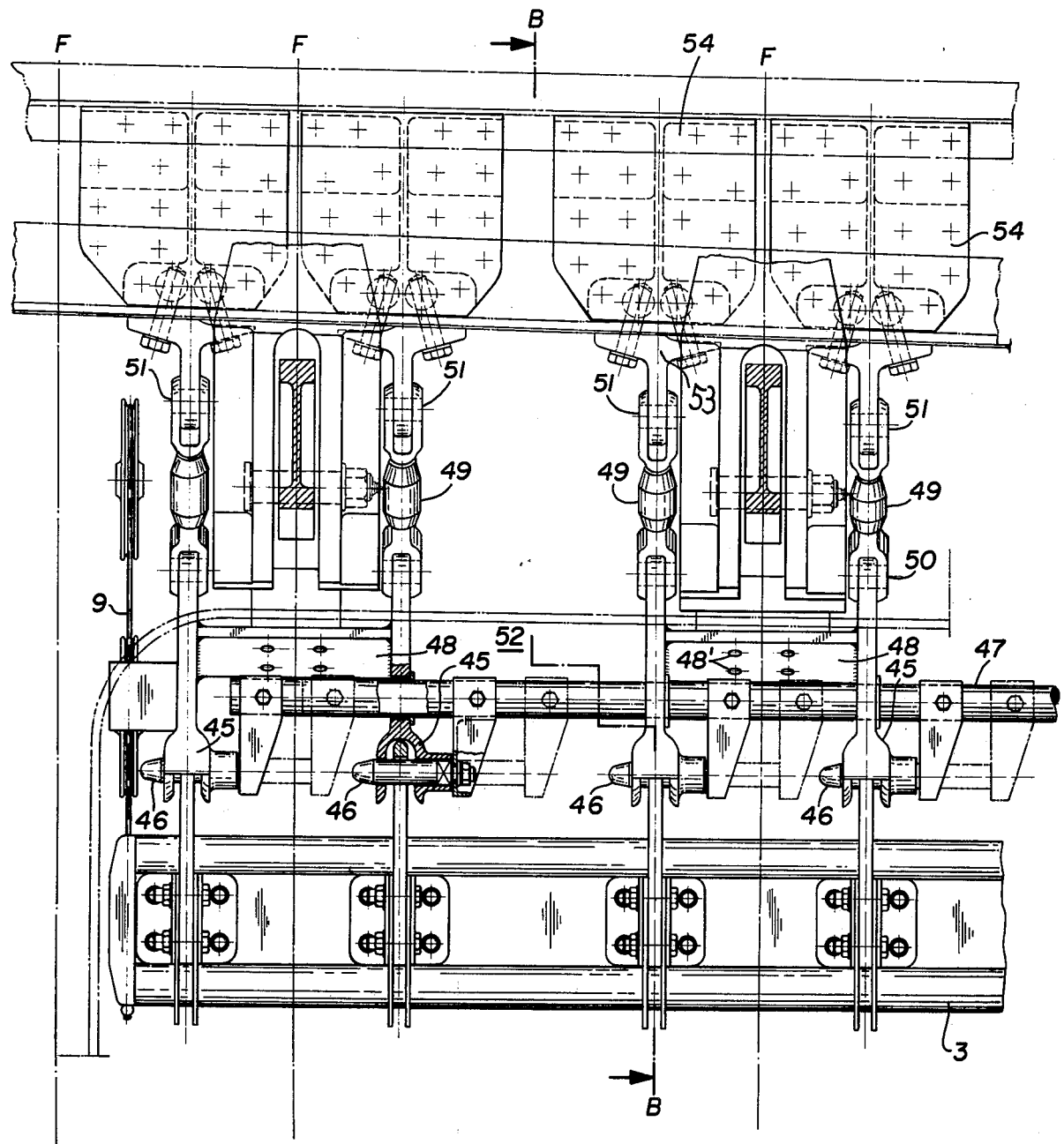
FIG. 11 is a view similar to that of FIG. 9, but showing the replacement of the hooks by eye-pieces and bolts operable in common.

A bearing block 36 is secured, for example, by screws to the hardware member 35. The hooks 8 are journaled in the bearing blocks 36 by means of bolts 37. If the mat is to cover the door opening, the eye-pieces 7, through which the sectional rod 3 extends, are lifted by means of ropes 9 running over sheaves 40 until the upper ends of the eye pieces 7 reach the position 41 shown in dashed lines in FIG. 8. The hooks 8 are then journaled downwardly to engage the bolts 37 in the eye-pieces. All the hooks 8 can be journaled simultaneously by means of a common shaft 43 to bring the hooks from the dashed line position 42 into the full line position or vice versa. The pull on the rope 9 is then somewhat slackened whereby the hooks 8 engage the bolts 37 in the eye-pieces whereby a force transmitting connection is established. The mat may easily be released from the hooks by simply pulling on the rope 9 and turning the hooks into the dashed position 42. FIGS. 10 and 11 show a further embodiment for releasably securing the upper edge of a mat to the door frame structure. The hooks have been replaced by bolts 46 operable in common which extend through holding claws 45 and through the eye-pieces 7 at the upper edge of the mat. The bolts 46 are operable in common by means of a push rod 47. Each claw 45 is secured to the frame structure 52 by means of a bracket 48 through which, for example, rivets 48' extend having a predetermined, limited holding strength. The claws 45 are connected in pairs by means of the brackets 48 and the upper end of the claws are connected to pulling rods 49 by means of bolts 50. The brackets 48 and two claws 45 thus form an H structure. As mentioned, the rivets 48' have a certain holding strength and in case of an emergency, such as a door failure, in response to which the mat would take up the dashed line position shown in FIG. 10 the bracket 48 is torn off the frame structure, due to the pressure applied to the mat. The frame structure 52 is shown in dashed lines only to simplify the illustration.

Upon the severing of the rivets 48', the forces applied to the mat are directly transmitted into the frame structure 53, 54 of the aircraft body through the tension rods 49 whereby the immediate door frame structure 52 and the floor carrier is relieved of the forces occurring in an emergency, thus protecting the floor structure in the aircraft from collapse. The dashed line position 55 in FIG. 10 illustrates the position of the mat holding elements after a door failure. The raising and lowering of the mat is the same as said described with reference to FIGS. 8 and 9 except that the bolts 46 are all operated in unison by the push rod 47 to withdraw the bolts 46 from the eye-pieces 7 and the claws 45. The withdrawn position of the bolts 46 is shown in dashed lines in FIG. 11.

Although the invention has been described with reference to specific example embodiments, it will be appreciated, that it is intended to cover all modifications and equalivents within the scope of the appended claims.

What is claimed is:

1. An apparatus for delaying the pressure drop due to an explosive decompression in a pressurized aircraft cabin structure, having a door opening therein and door means including a locking mechanism for closing said door opening, following a failure in the locking mechanism said door opening being defined by respective structural elements forming part of said cabin structure, said apparatus comprising air permeable mat means having a defined air permeability, and means for removably securing said mat means to said structural elements defining said opening to cover said opening in addition to said door, said mat means comprising upper and lower edges as well as said edges, said securing means comprising means connecting said upper and lower edges of said mat means in a force transmitting manner to said opening defining structural elements whereby the mat means are capable of taking up forces effective on the cabin structure when a pressure drop occurs, said mat means further comprising a plurality of belts, said securing means comprising a plurality of connecting members for connecting said belts to the cabin structure.

2. The apparatus according to claim 1, wherein said belts are interlaced or interwoven with each other.

3. The apparatus according to claim 1, wherein said mat means comprise a supporting drum on which the mat means is mounted along one end of the mat means whereby the mat means may be rolled-up, said securing means comprising a plurality of connecting means attached to the other free end of the mat means for a rapid securing of the free end of the mat means to the cabin structure.

4. The apparatus according to claim 1, wherein said mat means comprise upper and lower edges as well as side edges, said securing means comprising substantially permanent securing elements at the lower edge of said mat means, and rapid release securing means at the upper edge of said mat means, said apparatus further comprising lifting means secured to said mat means and arranged along the side edges thereof for raising and lowering said mat means.

5. The apparatus according to claim 6, wherein said substantially permanent securing means comprise ropes, chains or belts, and wherein said rapid release securing means comprise releasable hooks, said lifting means comprising, ropes, chains or belts for raising and lowering said mat means.

6. The apparatus according to claim 1, wherein said mat means have an air permeability expressed as a pressure equalization factor smaller than or equal to 2.4 PSI/sec.

7. The apparatus according to claim 1, wherein said mat means comprise upper and lower edges as well as side edges, said securing means comprising substantially permanent securing elements at the upper edge of said mat means, and rapid release securing means at the lower edge of said mat means, said apparatus further comprising lifting means secured to said mat means and arranged along the side edges thereof for raising and lowering said mat means.

8. The apparatus according to claim 7, wherein said substantially permanent securing means comprise ropes, chains, or belts, and wherein said rapid release securing means comprise releasable hooks, said lifting means comprising, ropes, chains or belts for raising and lowering said mat means.

9. An aircraft having a cabin with an opening for loading and unloading said aircraft, said opening being defined by structural elements of said aircraft, a door mounted to selectively, sealingly close said opening, said door being hinged to open outwardly of said cabin structure and having a locking mechanism, whereby a pressure differential between the inside and outside of said cabin may result in the outward movement of said door upon failure of said locking mechanism, and means for inhibiting explosive decompression of said cabin upon failure of said locking mechanism, comprising an air permeable mat means having a defined permeability, and means for mounting said mat means to cover said opening inwardly of said door, said mounting means comprising means for holding one edge of said mat means adjacent one edge of said opening, securing means fixedly mounted to said structural elements at the opposite side of said opening, and securing means including a plurality of catch means positioned to releasably hold the opposite edge of said mat means at spaced apart locations, and means interconnecting said catch means to simultaneously selectively catch or release said other edge of said mat means.

10. The aircraft of claim 9, wherein said mat means has a plurality of eyes spaced along said other edge thereof, said securing means comprising hook means positioned to engage said eyes.

11. The aircraft of claim 10, wherein said means interconnecting said catch means comprises rotatable rod means connected to said hooks for moving said hooks in unison into and out of engagement with said eyes.

12. The aircraft of claim 9, wherein said mat means has a plurality of eyes spaced along said other edge thereof, said securing means comprising pin means mounted to engage said eyes, said means interconnecting said catch means comprising rod means axially movable and mounted to said pin means for simultaneously moving said pin means into and out of engagement with said eyes.

13. The aircraft of claim 9, wherein said securing means is fixedly mounted to a first structural element of said aircraft, and further comprising link means pivotally connecting said securing means to a second structural element of said aircraft, whereby opening of said door due to failure of said locking mechanism results in the destructive interconnection between said securing means and said first structural element.

14. The aircraft of claim 13, wherein said first structural element comprises a structural element defining a floor horizontally separating said cabin into upper and lower compartments, and said second structural element comprises an outer structural element of said aircraft.

15. The aircraft of claim 9, wherein said holding means comprises means for fixedly holding said one edge of said mat means adjacent said one edge of said opening, and further comprising hook means on said mat means adjacent said one edge thereof for releasably holding the other edge of said mat means, for enabling loading and unloading of said aircraft.

16. The aircraft of claim 9, wherein said holding means is adjacent the side of said opening to which said door is hinged.

17. The aircraft of claim 16, wherein said means for holding comprises means fixedly holding said one edge of said mat means to said opening, and further comprising elongated flexible means mounted to selectively hold said mat means against the inside of said door when said catch means is released from the other edge of said mat means.

18. The aircraft of claim 16, wherein said means for holding comprises profile rod means mounted to extend parallel to said one edge of said opening.

19. The aircraft of claim 9, wherein said mat means comprises a plurality of belts interwoven to extend orthogonally across said mat means, rod means connected to the ends of said belts extending to said other edge of said mat means, whereby said belts are interconnected in a force transmitting manner to said rod means, and eye means connected in spaced apart relation to said rod means, said securing means further comprising means simultaneously movable into or out of engagement with said eyes for releasably securing said other edge of said mat means to said structural elements in a force transmitting manner.

* * * * *

UNITED STATES PATENT OFFICE
CERTIFICATE OF CORRECTION

Patent No. 4,073,452    Dated February 14, 1978

Inventor(s) Dieter Gosau

It is certified that error appears in the above-identified patent and that said Letters Patent are hereby corrected as shown below:

In the cover sheet, item [57] beneath the "ABSTRACT" "19 Claims, 16 Drawing Figures" should read --19 Claims, 15 Drawing Figures--.

Column 6, line 4, "said" (first occurrence) should be --side--.

Column 6, line 33, "claim 6," should be --claim 4,--.

Column 7, line 7, "and" should be --said--.

Signed and Sealed this

Ninth Day of May 1978

[SEAL]

Attest:

RUTH C. MASON
Attesting Officer

LUTRELLE F. PARKER
Acting Commissioner of Patents and Trademarks